United States Patent [19]

Kawaguchi et al.

[11] Patent Number: 5,624,240
[45] Date of Patent: Apr. 29, 1997

[54] PISTON TYPE VARIABLE DISPLACEMENT COMPRESSOR

[75] Inventors: Masahiro Kawaguchi; Shigeki Kanzaki; Ken Suitou; Toshiro Fujii; Tomohiko Yokono; Masanori Sonobe, all of Kariya, Japan

[73] Assignee: Kabushiki Kaisha Toyoda Jidoshokki Seisakusho, Kariya, Japan

[21] Appl. No.: 266,130

[22] Filed: Jun. 27, 1994

[51] Int. Cl.⁶ .................................................. F04B 1/29
[52] U.S. Cl. ............................................. 417/222.2
[58] Field of Search ........................ 417/222.1, 222.2, 417/269, 270

[56] References Cited

U.S. PATENT DOCUMENTS

| | | | |
|---|---|---|---|
| 4,526,516 | 7/1985 | Swain et al. | 417/222.2 |
| 4,553,905 | 11/1985 | Swain et al. | 417/222.2 |
| 4,729,718 | 3/1988 | Ohta et al. | 417/222.2 |
| 4,730,986 | 3/1988 | Kayukawa et al. | 417/222.2 |
| 4,747,754 | 5/1988 | Fujii et al. | 417/222.2 |
| 4,867,648 | 9/1989 | Murayama et al. | 417/222.2 |
| 5,000,666 | 3/1991 | Esaki | 417/222.2 |
| 5,032,060 | 7/1991 | Kobayashi et al. | 417/222.1 |
| 5,059,097 | 10/1991 | Okazaki et al. | 417/222.2 |
| 5,145,326 | 9/1992 | Kimura et al. | 417/222.2 |
| 5,152,673 | 10/1992 | Pettit et al. | 417/222.2 |
| 5,205,718 | 4/1993 | Fujisawa et al. | 417/222.2 |

FOREIGN PATENT DOCUMENTS

| | | | |
|---|---|---|---|
| 3500298 | 2/1990 | Germany. | |
| 3416637 | 3/1990 | Germany. | |
| 2-49976 | 2/1990 | Japan | 417/222.1 |
| 3-143725 | 6/1991 | Japan. | |
| 5-231312 | 9/1993 | Japan. | |

*Primary Examiner*—Peter Korytnyk
*Attorney, Agent, or Firm*—Brooks Haidt Haffner & Delahunty

[57] ABSTRACT

Disclosed is a compressor having a drive shaft in a crank chamber and a swash plate supported on the drive shaft for integral rotation therewith to drive a piston in a cylinder bore. The piston compresses gas sucked from a suction chamber into the cylinder bore and discharges the compressed gas to a discharge chamber and the amount of the discharged gas is variable between a minimum and maximum values based on variation of the inclined angle of the swash plate between a minimum and maximum values. The compressor comprises a passage for leading the gas into the crank chamber from the discharge chamber to alter the inclined angle of the swash plate, a valve for selectively opening and closing the passage to lead the gas into the crank chamber via the passage when the valve opens the passage, and a control apparatus for controlling the inclined angle of the swash plate, which operates in accordance with the operation of the valve to hold the swash plate at the minimum inclined angle when the valve means opens the passage.

16 Claims, 12 Drawing Sheets

Fig.7

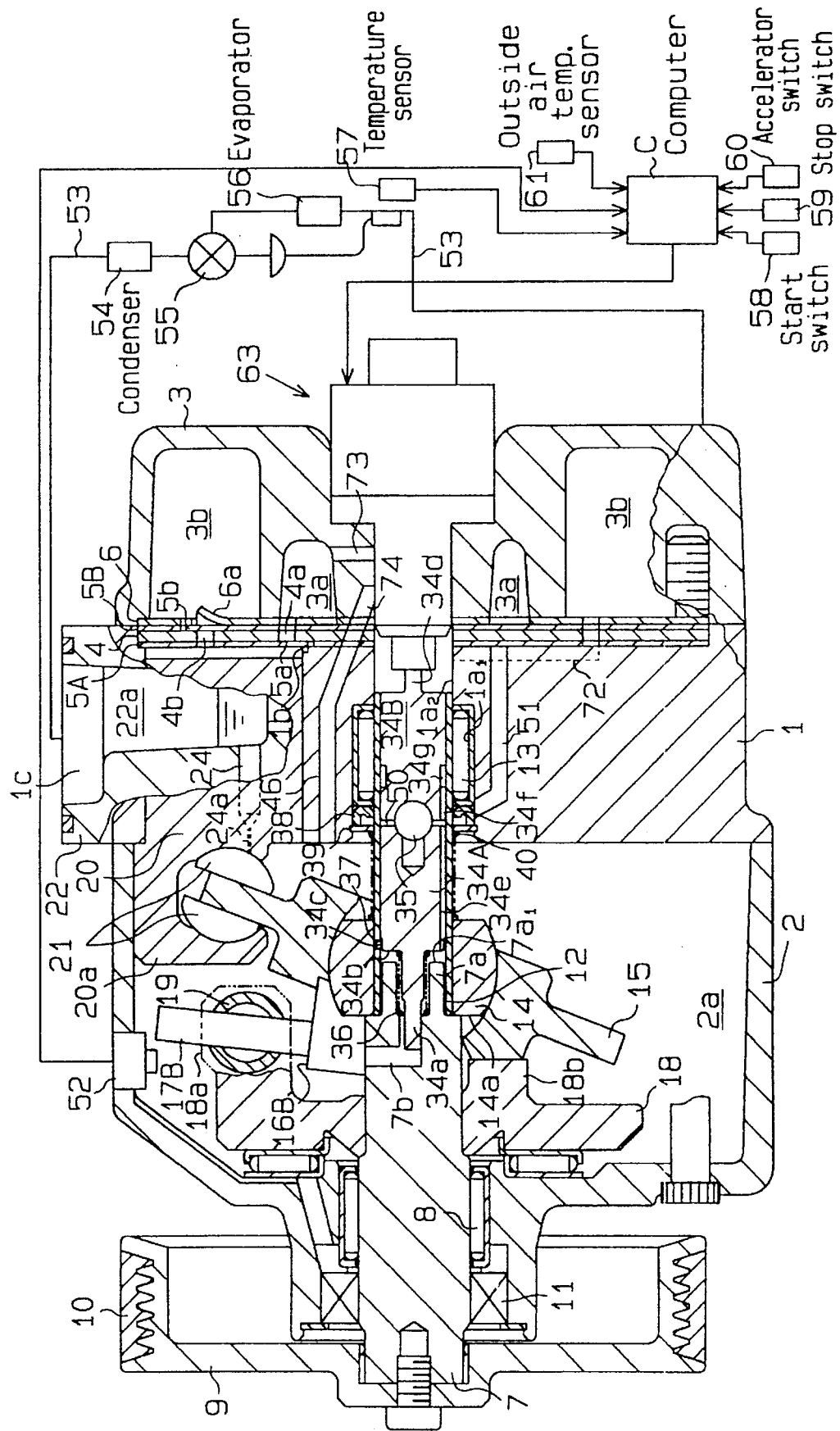

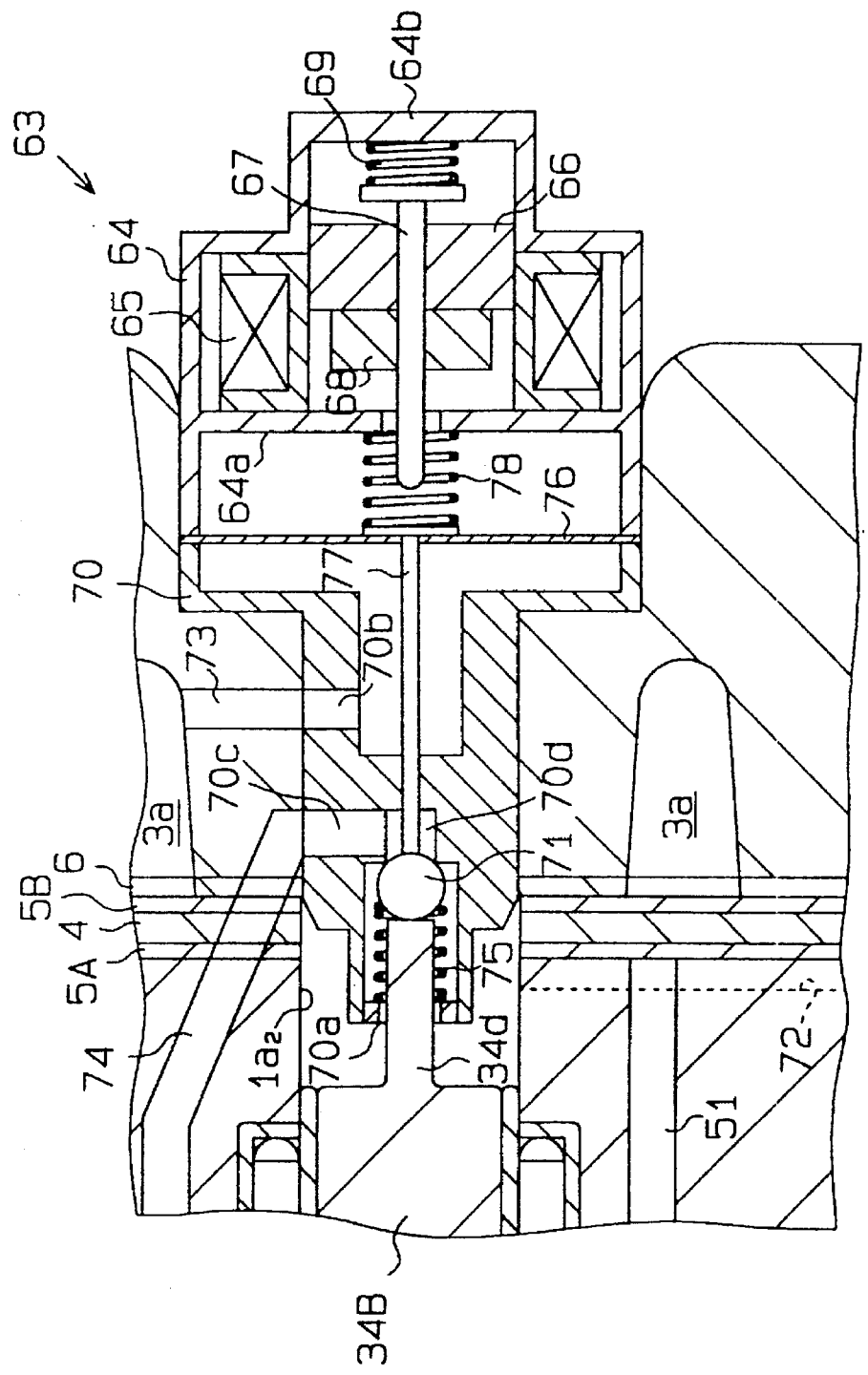

PISTON TYPE VARIABLE DISPLACEMENT COMPRESSOR

BACKGROUND OF THE INVENTION

1. Field of the Invention

The present invention relates to a piston type variable displacement compressor, and more particularly, to a piston type variable displacement compressor which controls the inclined angle of a swash plate, tiltably supported on a rotary shaft, by utilizing the pressure differential between a crank chamber and a section chamber, and which converts the rotational motion of the swash plate to the reciprocal linear motion of each piston.

2. Description of the Related Art

In general, compressor units used in automobiles, trucks and the like are used to supply compressed refrigerant gas to the vehicle's air conditioning system. To maintain air temperature inside the vehicle at a level comfortable for the vehicle's passengers, it is important to utilize a compressor whose displacement amount of the refrigerant gas is controllable. One known compressor of this type controls the inclined angle of a swash plate, tiltably supported on a rotary shaft, based on the difference between the pressure in a crank chamber and the suction pressure, and converts the rotational motion of the swash plate to the reciprocal linear motion of each piston.

In the conventional compressor, an electromagnetic clutch is provided between an external driving source, such as the vehicle's engine, and the rotary shaft of the compressor. Power transmission from the driving source to the rotary shaft is controlled by the ON/OFF action of this clutch. When power transmission from the driving source to the rotary shaft is interrupted, the compressor's displacement of refrigerant gas is set to zero. At the time the electromagnetic clutch is activated or deactivated, the clutch's action generates a shock generally detrimental not only to the compressor but also to the overall driving comfort experienced by the vehicle's passengers.

To solve the above shortcoming, Japanese Unexamined Patent Publication No. 3-143725 discloses a compressor designed to set the displacement amount to zero without using an electromagnetic clutch. This compressor utilizes an increase of pressure in the crank chamber where the swash plate is accommodated, to set the inclined angle of the swash plate to zero degrees. Any quick increase in crank case pressure would, according to this design, result in a rapid and complete reduction of the compressor's gas displacement. This, in turn, would decrease the load of the compressor on the driving source. For compressor-equipped vehicles, however, it would be advantageous to use all the engine's power to drive the vehicle, especially when the vehicle is accelerating or is going uphill. In such instances, therefore, power supplied to the compressor would be temporarily interrupted to reduce the engine load produced by auxiliary machines such as the compressor.

To restore the conventional compressor's output displacement, a hydraulic actuator is used to increase the inclined angle of the swash plate. Displacement control is effected by two switches. A first electromagnetic switch, disposed in a gas passage connecting the conventional compressor's discharge and crank chambers, opens the the passage to set the displacement amount to zero. A second electromagnetic switch, disposed in an oil passage connecting an oil reserve at the bottom of the crank chamber to the hydraulic actuator, opens the oil passage to restore the displacement amount.

The installation of the two electromagnetic switches in the compressor, however, inevitably increases the size and weight of the compressor. This is a considerable disadvantage. Moreover, according to the conventional design, if the displacement mount is kept at zero, the refrigerant gas in the crank chamber tends to escape into the suction pressure area to equalize the pressure of the refrigerant gas in the compressor. Consequently, the inclination of the swash plate is subject to unpredictable and uncontrollable change making, accurate control over the compressor's displacement output difficult.

SUMMARY OF THE INVENTION

The present invention, accomplished with a view to solving the above problems, has as a primary object to provide a compressor having a design that allows for accurate control over the compressor's displacement output without the need for having a clutch between a driving source and the compressor.

It is another object of this invention to provide a compact and light compressor capable of accurate control over its displacement output.

To achieve the forgoing objects, according to the present invention, there is provided a compressor having a drive shaft in a crank chamber and a swash plate supported on the drive shaft for integral rotation therewith to drive a piston in a cylinder bore. The piston compresses gas sucked from a suction chamber into the cylinder bore and the compressed gas to a discharge chamber and the amount of the discharged gas is variable between a minimum and a maximum value based on variation of the inclined angle of the swash plate between a minimum and a maximum value. The compressor comprises a passage means for leading the gas into the crank chamber from the discharge chamber to alter the inclined angle of the swash plate, a valve means for selectively opening and closing the passage means to lead the gas into the crank chamber via the passage means when the valve opens the passage means, and a control means for controlling the inclined angle of the swash plate, which operates in accordance with the operation of the valve means to hold the swash plate at the minimum inclined angle when the valve means opens the passage means.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7 is a cross-sectional side view of the compressor in FIG. 1 when its displacement amount is zero;

FIG. 11 is a cross-sectional side view showing the overall compressor according to another embodiment of this invention; and FIG. 12 is an enlarged cross-sectional side view showing a part of the second embodiment shown in FIG. 11.

DETAILED DESCRIPTION OF THE PREFERRED EMBODIMENTS

Figure 1:
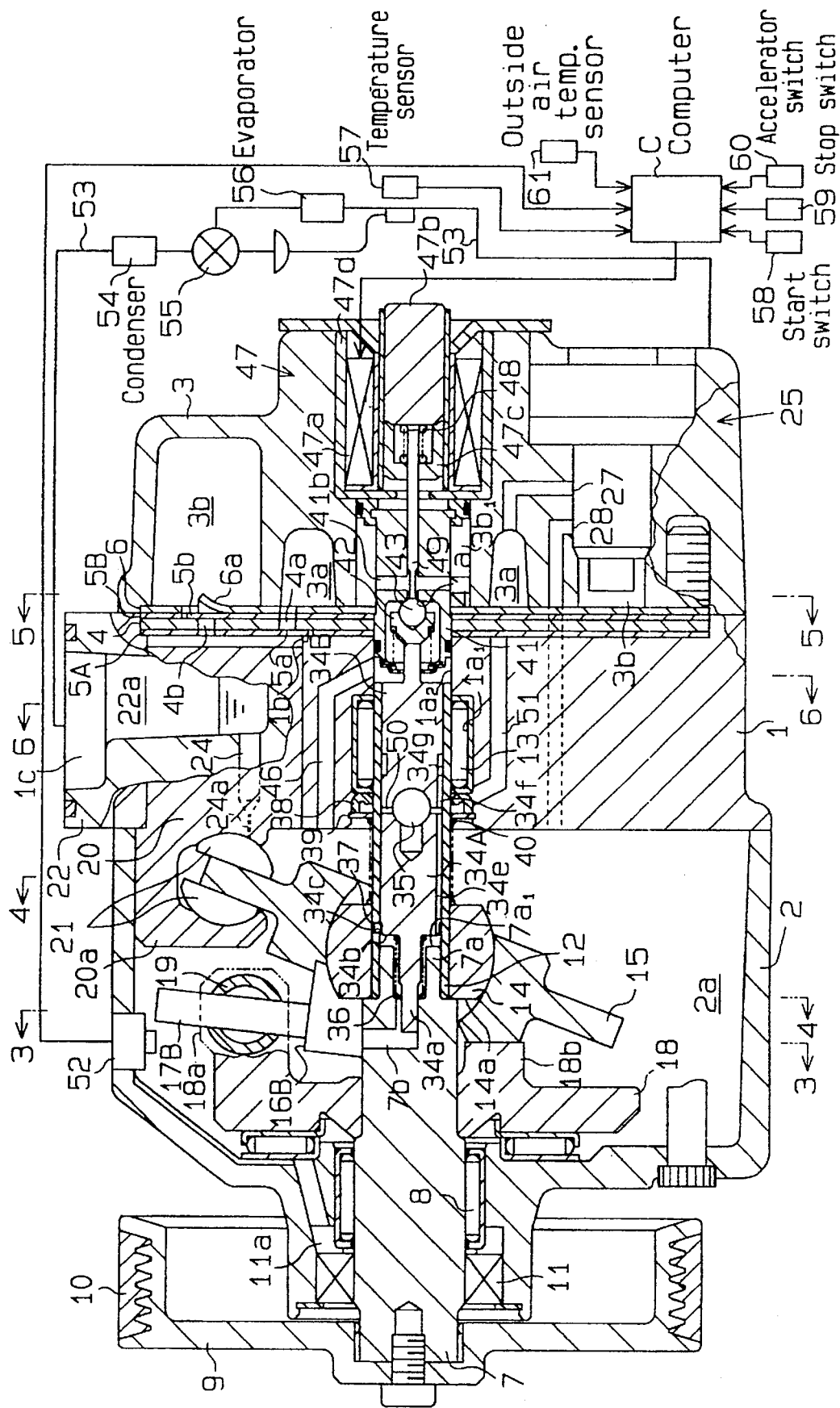
FIG. 1 is a fragmentary cross-sectional side view illustrating the overall compressor according to one embodiment of the present invention.

A compressor according to one embodiment of the present invention for use in an air conditioning system will now be described referring to FIGS. 1 through 8. As shown in FIG. 1, a front housing 2 of the compressor is fixed to the front end of a cylinder block 1 that also serves as a portion of the compressor's housing. A rear housing component 3 is secured to the rear end of the cylinder block 1 via a valve plate 4, valve forming plates 5A and 5B and a retainer forming plate A rotary shaft 7 is rotatably supported in the front housing 2 via a radial bearing 8. The front end of the rotary shaft 7 protrudes from a crank chamber 2a in the front housing 2, and fastens to a pulley 9. The pulley 9 is drivingly coupled to the engine of a vehicle via a belt 10. A lip seal, provided between the front end of the rotary shaft 7 and the front housing 2, prevents gas from leaking from the crank chamber 2a.

A rotary support 18 is secured on the rotary shaft 7, and a cylinder 12 is pressed fit over the internal end portion 7a of the rotary shaft 7. The cylinder 12 is rotatably supported in the cylinder block 1 via a radial bearing 13 provided in a retaining hole $1a_1$ in the cylinder block 1, and rotates together with the rotary shaft 7.

A sleeve 14 having a spherical support face is slidably supported on the cylinder 12, with a swash plate 15 supported on the sleeve 14 in such a way as to be tiltable forward and backward in the axial direction of the cylinder 12. Intervening between the inner wall of the retaining hole $1a_1$ of the cylinder block 1 and the cylinder 12 is a seal ring 38 which separates the radial bearing 13 from the crank chamber 2a. A clip 39 prevents the seal ring 38 from coming into the crank chamber 2a.

A spring 40 is provided between the clip 39 and the sleeve 14 that urges the sleeve 14 toward the rotary support 18. As the swash plate 15 tilts and abuts on a projection 18b of the rotary support 18, the inclined angle reaches a maximum as shown in FIG. 1. When the spring 40 is fully compressed, the inclined angle of the swash plate 15 reaches minimum (i.e., 0 degrees) and the swash plate 15 is aligned at a neutral position.

Figure 3:
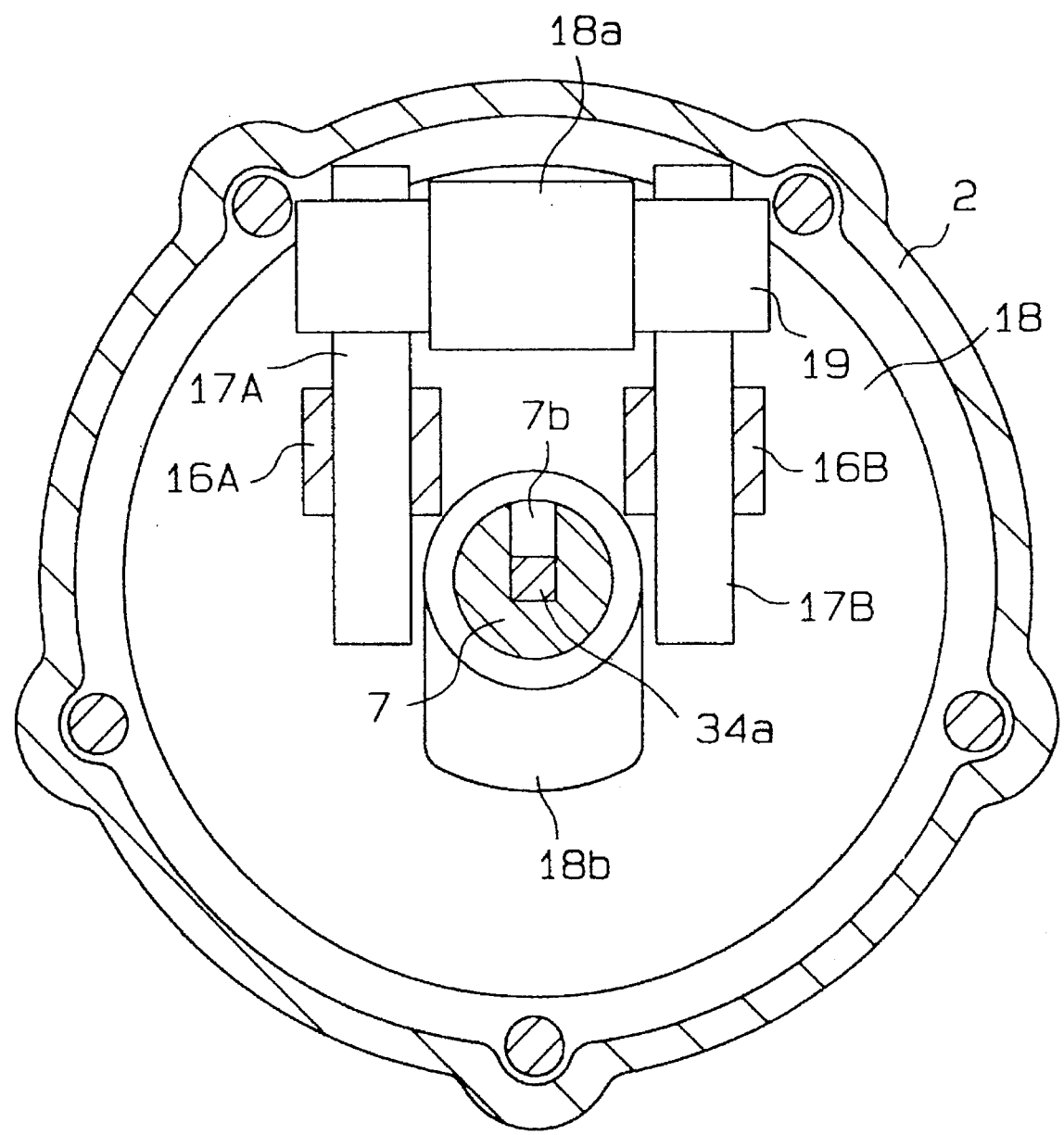
FIG. 3 is a cross-sectional view taken along the line 3—3 in FIG. 1.

As shown in FIGS. 1 and 3, link pieces 16A and 16B are secured to the swash plate 15. A pair of guide pins 17A and 17B are secured to the link pieces 16A and 16B respectively as shown in FIG. 3. A support arm 18a protrudes from the rotary support 18, and a support cylinder 19, extending perpendicular to the rotary shaft 7, rotatably inserts into the support arm 18a. The guide pins 17A and 17B are fitted in the respective end portions of the support cylinder 19. The interlocked action of the support cylinder 19 on the support arm 18a and the guide pins 17A and 17B permits the swash plate 15 to rock forward and backward in the axial direction of the rotary shaft 7 and cylinder 12 around the sleeve 14. The same interlocked action permits the rotary shaft 7 and cylinder 12 to rotate together.

A plurality of cylinder bores 1b are formed through the cylinder block 1 so as to connect to the crank chamber 2a. A single-head piston 20 is retained in each cylinder bore 1b, with a pair of shoes 21 slidably fitted in a neck 20a of this piston 20. The peripheral edge portion of the swash plate 15 is inserted between the shoes 21 so that the end faces of both shoes 21 are in contact with both surfaces of the swash plate 15. Accordingly, the rotational motion of the swash plate 15 is converted to the reciprocal motion of the single-head piston 20 via the shoes 21, causing the piston 20 to move forward and backyard in the associated cylinder bore 1b.

Figure 5:
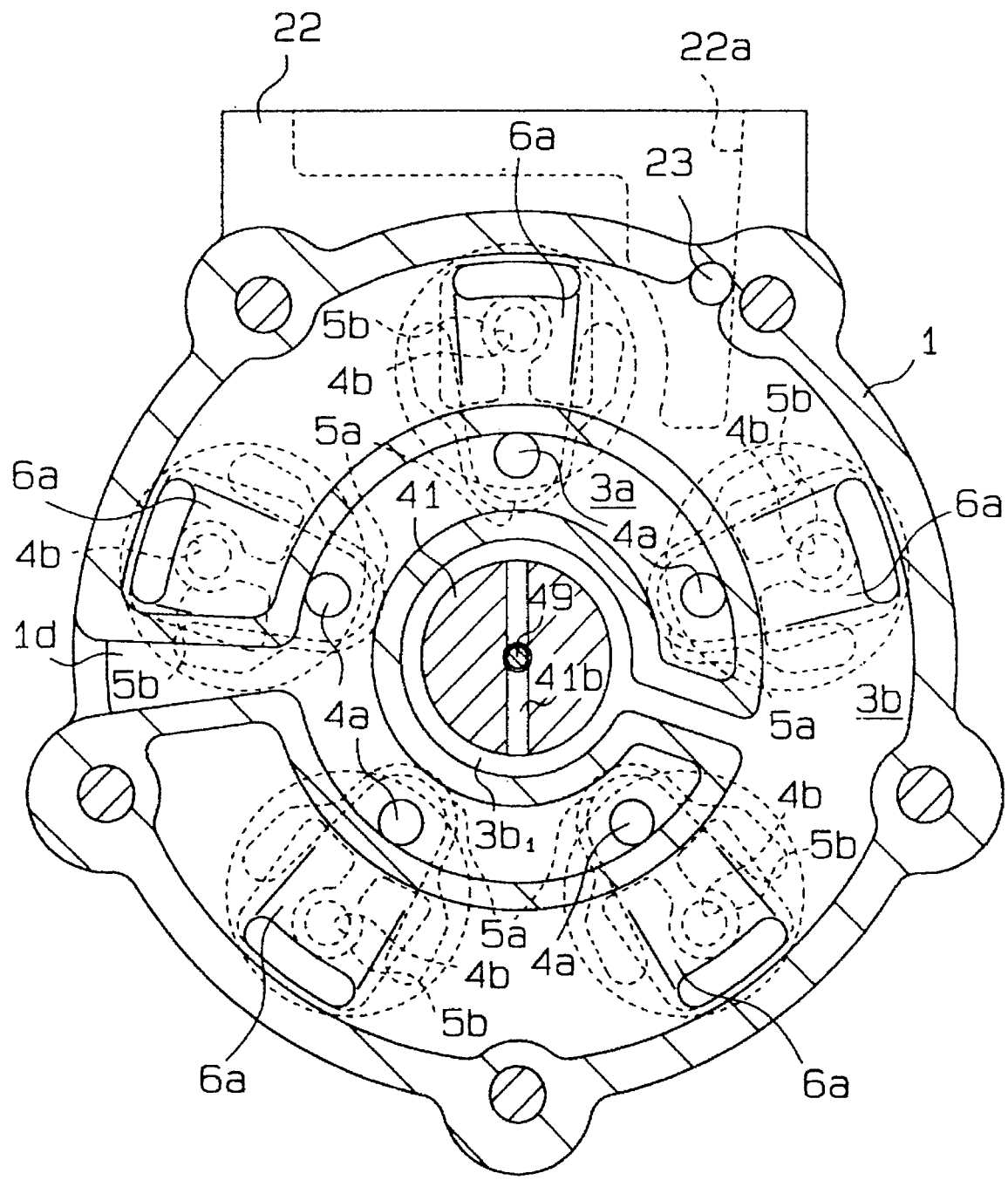
FIG. 5 is a cross-sectional view taken along the line 5—5 in FIG. 1.

As shown in FIGS. 1 and 5, a suction chamber 3a and a discharge chamber 3b are defined in the rear housing 3. A suction port 4a and a discharge port 4b are formed on the valve plate 4. A suction valve 5a is formed on the valve forming plate 5A, and a suction valve 5b on the valve forming plate 5B. The returning action of the single-head piston 20 allows the refrigerant gas in the suction chamber 3a to push the suction valve 5a open, and to enter the cylinder bore 1b through the suction port 4a. As the single-head piston 20 moves forward, the refrigerant gas, already in the cylinder bore 1b, pushes the discharge valve 5b open and gets discharged into the discharge chamber 3b via the discharge port 4b. The discharge valve 5b abuts on a retainer 6a on the retainer forming plate 6 so that the angle of the valve 5b is restricted by the abutment.

Figure 6:
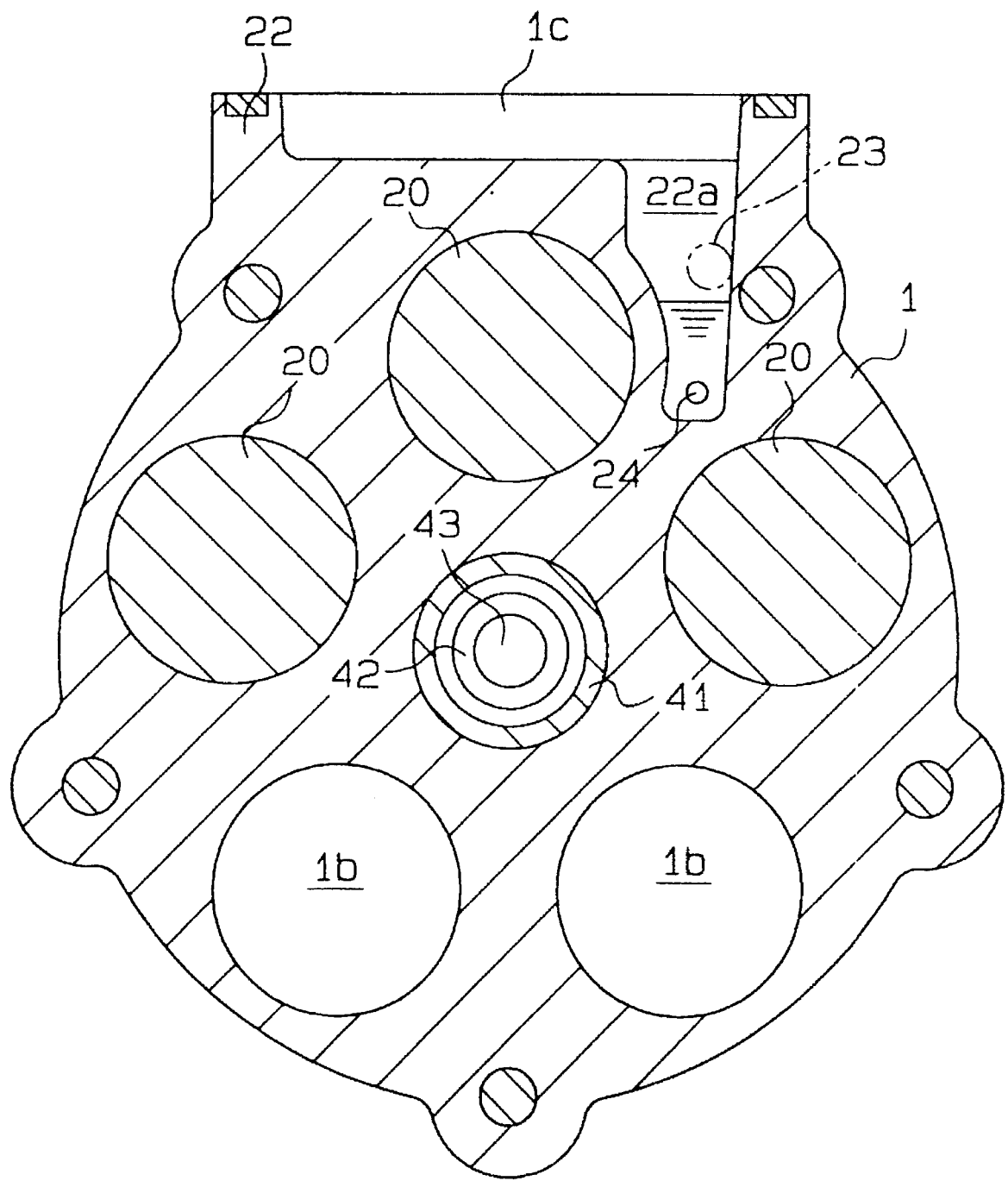
FIG. 6 is a cross-sectional view taken along the line 6—6 in FIG. 1.

As shown in FIGS. 1 and 6, a discharge flange 22 is formed on the top of the cylinder block 1, with an outlet port 1c provided in the discharge flange 22. Formed in the discharge flange 22 is an oil reservoir 22a which is connected to the outlet port 1c. The oil reservoir 22a has a circular cross section. The oil reservoir 22a is connected via a discharge passage 23 to the discharge chamber 3b, allowing the refrigerant gas in the discharge chamber 3b to be discharged to the oil reservoir 22a. The discharge passage 23 is open toward a position eccentric to the axis of the oil reservoir 22a. This allows the refrigerant gas to be sprayed along the wall of the oil reservoir 22a during the time the refrigerant gas is discharged. At the same time, an oil mist suspended in the refrigerant gas is separated from the gas and is stored in the oil reservoir 22a. The refrigerant gas discharged to the oil reservoir 22a flows to an external refrigerant circuit through the outlet port 1c. The bottom of the oil reservoir 22a is connected via an oil passage 24 to a lubrication passage 11a of the lip seal 11. A restriction 24a is provided midway in the oil passage 24. The lubrication passage 11a is connected to the crank chamber 2a through the clearance between the radial bearing 8 and the rotary shaft 7.

The stroke of the single-head piston 20 changes in accordance with the difference between the pressure in the crank chamber 2a, acting on the piston 20, and the suction pressure in the cylinder bore 1b. The differential pressure acts on the swash plate 15 via the piston 20 to change the inclined angle of the swash plate 15, thus changing the compression displacement. The pressure in the crank chamber 2a is controlled by a control valve 25 that is attached to the bottom of the rear housing 3.

Figure 2:
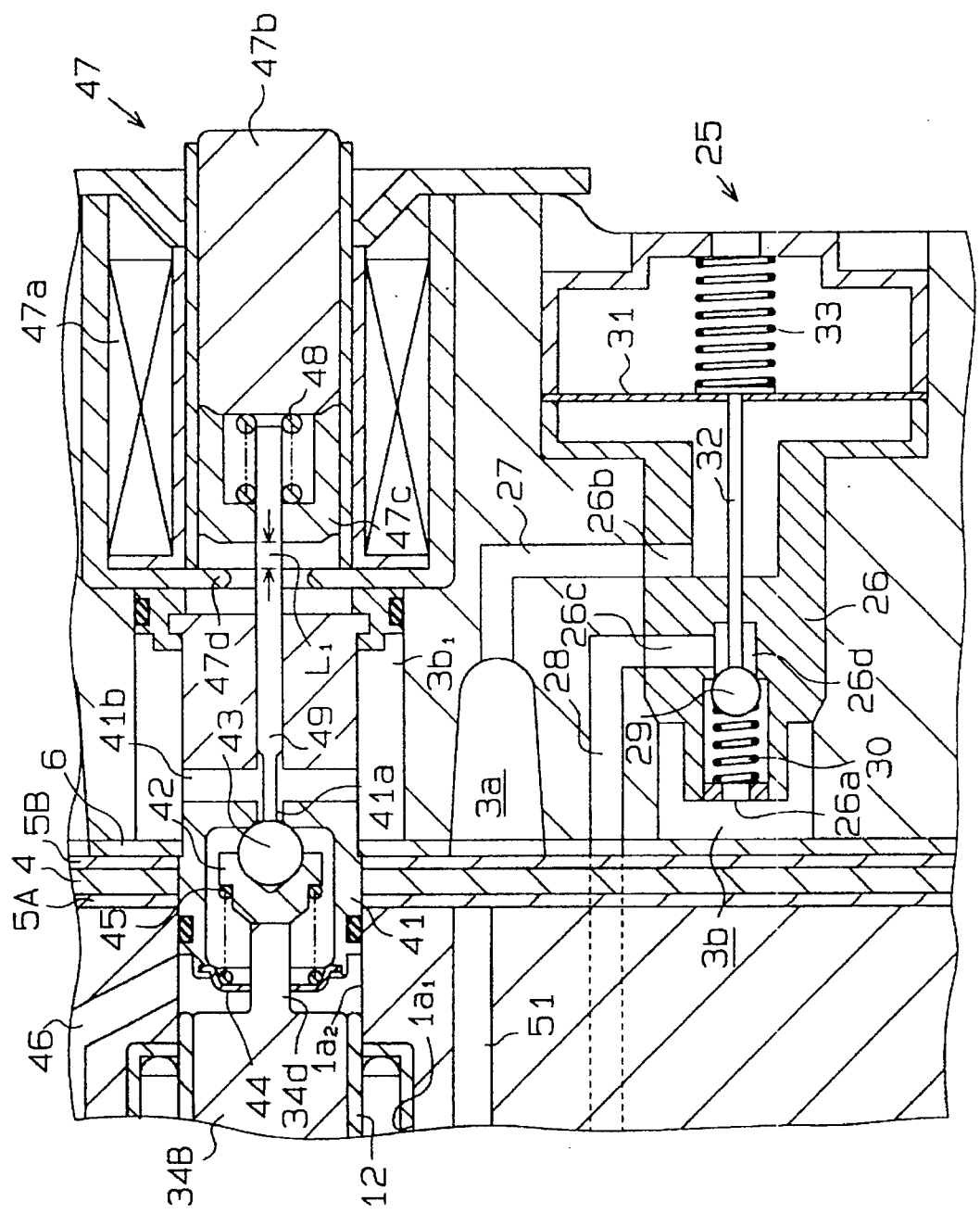
FIG. 2 is an enlarged fragmentary cross-sectional side view showing two valves in the compressor in FIG. 1.

As shown in FIG. 2, a valve housing 26 of the control valve 25 is provided with a first port 26a, a second port 26b and a control port 26c. The first port 26a is open to the discharge chamber $3b$, and the second port $26b$ is connected via a passage 27 to the suction chamber $3a$. The control port $26c$ is connected via a control passage 28 to the crank chamber $2a$. The control valve 25 has a ball-like valve body 29 which opens or closes the communication between the first port $26a$ and the control port $26c$.

Intervening between the inner will of the valve housing 26 and the valve body 29 is a return spring 30 which normally causes the valve body 29 to close a valve hole $26d$. With the valve hole $26d$ closed, the communication between the first port $26a$ and the control port $26c$ is blocked.

A diaphragm 31 is disposed in the vicinity of the outer end wall of the valve housing 26. A pressing rod 32 is slidably disposed in the valve housing 26. This pressing rod 32 normally blocks communication between the second port $26b$ and control port $26c$ in the housing 26. One end of the pressing rod 32 is secured to the diaphragm 31. A pressure spring 33 is disposed between the outer end wall of the valve housing 26 and the diaphragm 31, and resists the suction pressure via the diaphragm 31. The pressure spring 33 urges the pressing rod 32 in a constant abutting position against the valve body 29. The control valve 25 therefore controls the opening of the valve hole $26d$ in accordance with a change in suction pressure indicative of the cooling load. The pressure in the crank chamber $2a$ is thus automatically adjusted to control the inclined angle of the swash plate 15.

Figure 8:
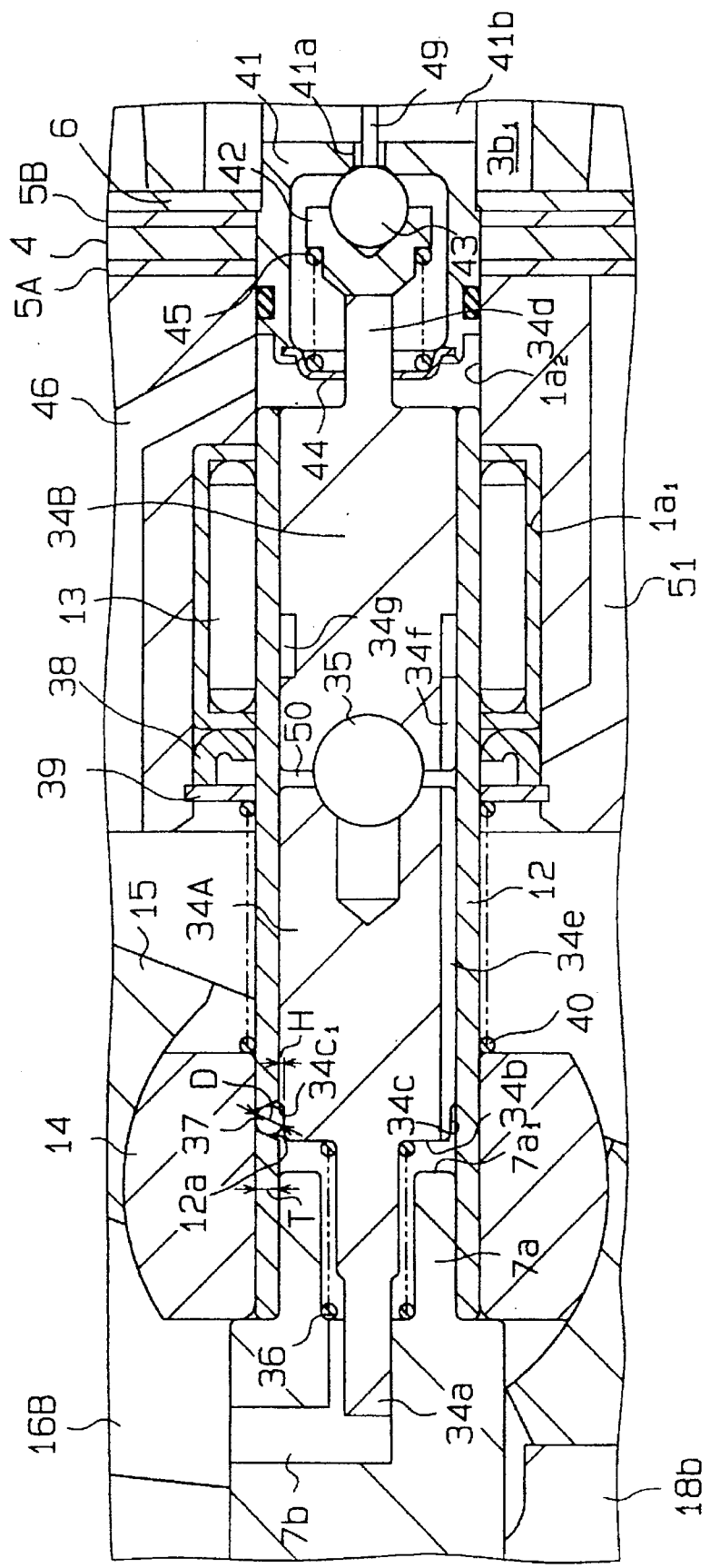
FIG. 8 is an enlarged fragmetary side view showing a ball valve in FIG. 1 the closed position.

As shown in FIGS. 1 and 8, a switching member, such as first and second switching pieces 34A and 34B are slidably accommodated in the cylinder 12, with a ball 35 disposed between the switching pieces 34A and 34B. The rotary shaft 7 has a small-diameter inner end portion $7a$ fitted in the cylinder 12. A vent passage $7b$ is formed, extending from the outer surface of the rotary shaft 7 to one end face $7a_1$ of the small-diameter inner end portion $7a$. A small-diameter portion $34a$ at the front end of the switching piece 34A is fitted in the vent passage $7b$, in such a way that allows the switching piece 34A to rotate together with the rotary shaft 7.

A spring 36, disposed between a step $34b$ of the switching piece 34A and a step $7b_1$ of the vent passage $7b$, urges both switching pieces 34A and 34B toward the rear housing 3.

Figure 4:
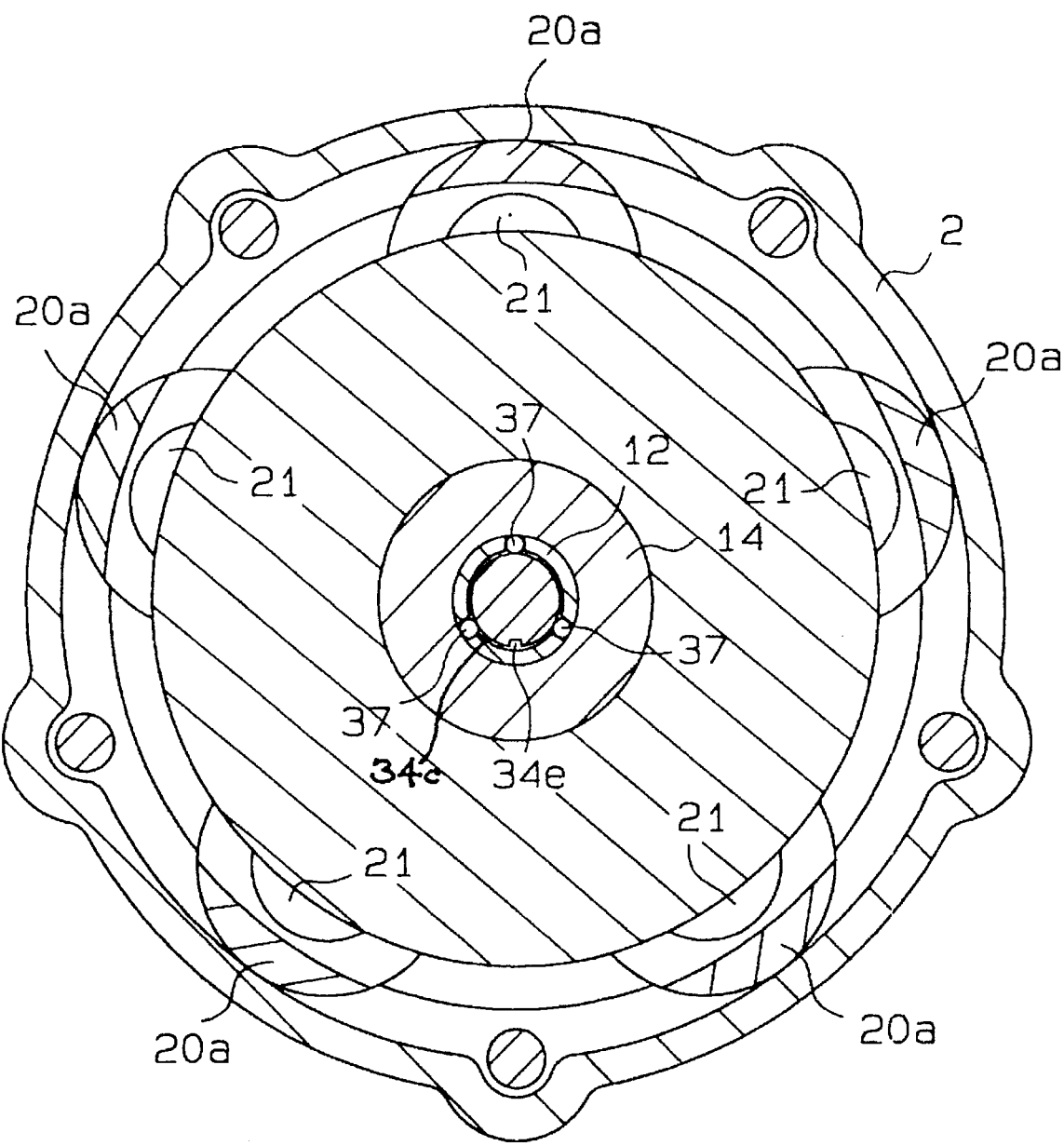
FIG. 4 is a cross-sectional view taken along the line 4—4 in FIG. 1.
Figure 7:
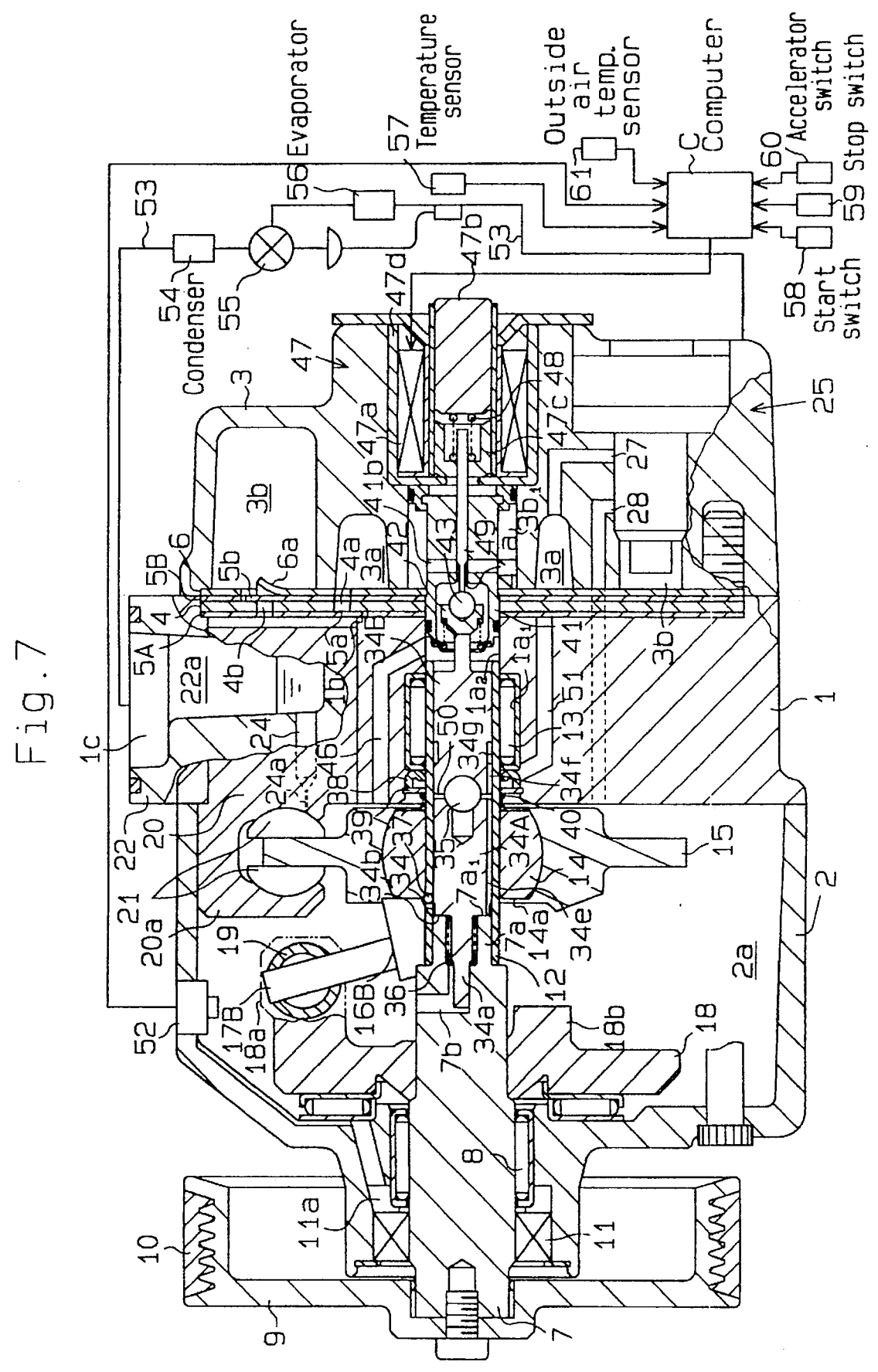
Figure 9:
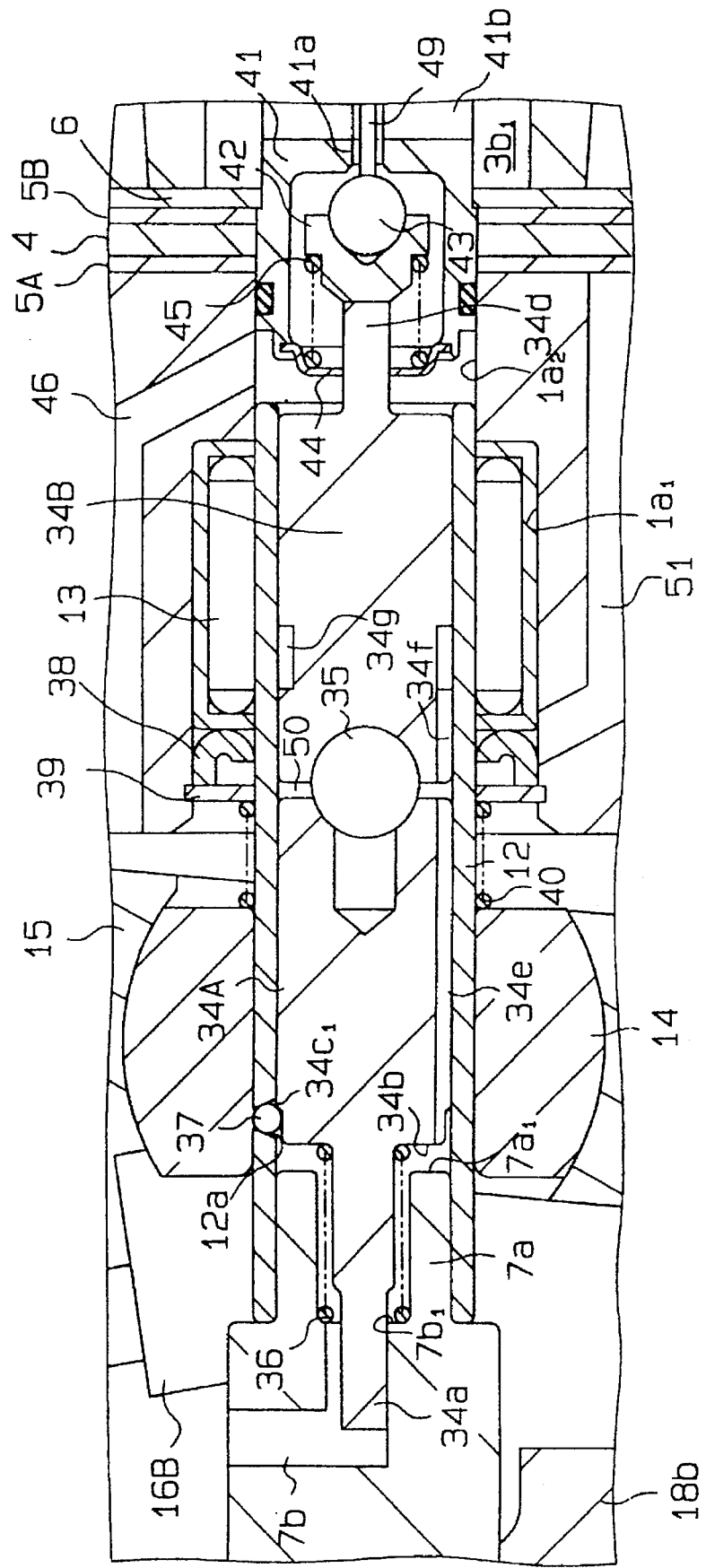
FIG. 9 is an enlarged fragmetary cross-sectional side view showing the ball valve in the FIG. 1 embodiment, in position slightly separated from its valve hole.

As shown in FIGS. 4 and 8, an annular groove $34c$ is formed in the large-diameter portion of the switching piece 34A. A plurality of holes $12a$ (three in this embodiment) are formed in the cylinder 12 in the circumferential direction at given intervals. Each hole $12a$ has a tapered shape, with the narrower portion of the hole extending toward the outer surface of the cylinder 12 from the inner surface. An operation member; such as a ball 37 is placed in each hole $12a$. The diameter, D, of the ball 37 is greater than the thickness, T, of the cylinder 12 but is smaller than (T+H), the sum of the thickness T of the cylinder 12 and the depth, H, of the groove $34c$. The minimum inner diameter of the hole $12a$ on the outer surface of the cylinder 12 is smaller than the diameter D of the ball 37. Therefore, a part (D−T) of the ball 37 can protrude from the hole $12a$. As shown in FIGS. 7 and 9, each ball 37 protrudes from the associated hole $12a$ to engage with the front end face $14a$, of the sleeve 14, and this engagement restricts the movement of the sleeve 14. With this arrangement, the swash plate 15 is kept at a neutral position with an inclined angle of zero degrees. With each ball 37 fitted inside the hole $12a$, the sleeve 14 is permitted to move on the cylinder 12.

As shown in FIGS. 1 and 2, a retaining hole $1a_2$ extends to the rear housing 3 in the cylinder block 1 and retains a part of the cylinder 12. A valve housing 41 is also secured in the retaining hole $1a_2$, while a valve seat 42 and a ball valve 43 are accommodated in the valve housing 41. A spring 45 is disposed between a spring seat 44, secured to the valve housing 41, and the valve seat 42. The ball valve 43 normally closes a valve hole $41a$ in the valve housing 41 due to the force of the spring 45.

A small-diameter rear end portion $34d$ of the switching piece 34B abuts on the back of the valve seat 42 by the force of the spring 36. The retaining hole $1a_2$ is connected to the crank chamber $2a$ via a pressure passage 46 formed in the cylinder block 1.

A discharge pressure region $3b_1$ formed in the center portion of the rear housing 3, is connected to the discharge chamber $3b$. A portion of the valve housing 41 protrudes into the discharge pressure region $3b_1$ through the retaining hole $1a_2$, as shown in FIG. 5. The valve hole $41a$ in the valve housing 41 communicates with the discharge pressure region $3b_1$ via a pressure passage $41b$. The ball valve 43, valve housing 41 and valve seat 42 therefore constitute a valve that opens or closes the passage $41b$ and 46.

Disposed in the center portion of the rear housing 3 is an electromagnetic valve 47 for forcibly altering the inclined angle of the swash plate 15. A valve housing $47d$ houses a coil $47a$, a fixed iron core $47b$, a movable iron core $47c$ and a spring 48. When the electromagnetic valve 47 is energized by current flowing the coil $47a$, the movable core $47c$ is attracted to the fixed core $47b$ against the force of the spring 48. The movable range L1 of the movable core $47c$ is determined by the position where the movable core $47c$ abuts on the fixed core $47b$ and the position where the movable core $47c$ abuts on the inner well of the housing $47d$.

A pressing rod 49, which is secured to the movable core $47c$, slidably penetrates the valve housing 41, and has its front end in abutment with the ball valve 43 via the valve hole $41a$. Therefore, the pressing rod 49 transmits the movement of the movable core $47c$ to the ball valve 43 so that the ball valve 43 moves within the moving range of the movable core $47c$ to come apart from the valve hole $41a$.

The switching pieces 34A and 34B, the ball 35, the valve seat 42, the ball valve 43 and the pressing rod 49 are interlocked with one another with respect to the movement in the axial direction of the rotary shaft 7 by the forces of the spring 36. When the electromagnetic valve 47 is energized under this situation, the mentioned individual members move toward the rear housing 3 by the forces of the springs 36 and 48. As a result, the step $34b$ of the switching piece 34A comes apart from the end face $7a_1$ of the rotary shaft 7, causing the groove $34c$ to be in line with the holes $12a$.

When the electromagnetic valve 47 is de-energized, the switching piece 34A moves toward the rotary shaft 7 by the force of the spring 48. Consequently, the step $34b$ abuts on the end face $7a_1$, separating the groove $34c$ from the line of the holes $12a$.

A line-like vent passage $34e$, extending in the axial direction of the switching piece 34A, is formed in the outer surface of the switching piece 34A. The vent passage $34e$ extends from the step $34b$ and communicates with a clearance 50 between the switching pieces 34A and 34B. With the step $34b$ abutting on the end face $7a_1$, the vent passage $34e$ is disconnected from the vent passage $7b$. Likewise, a line-like vent passage $34f$, extending in the axial direction of the switching piece 34B, together with an annular vent passage $34g$, extending in the circumferential direction thereof, are formed in the outer surface of the switching piece 34B. The vent passage $34f$ connects the clearance 50 to the vent passage $34g$. The retaining hole $1a_1$ and a vent passage 51, couple the vent passage $34g$ to the suction chamber $3a$.

A sensor 52 is provided in the front housing 2 as shown in FIG. 1. This sensor 52 detects the rotation of the rotary support 18 and sends a predetermined detection signal to a computer C. When receiving a signal from the rotation sensor 52 indicating the stopping of the rotary support 18, the computer C gives an instruction to de-energize the electromagnetic valve 47.

The inlet port 1d shown in FIG. 5 and the outlet port 1c shown in FIG. 1 are connected to each other by an external refrigerant circuit 53. This circuit 53 has a condenser 54, an expansion valve 55 and an evaporator 56. The expansion valve 55 controls the amount of the refrigerant gas allowed in the circuit 53 in accordance with a change in gas pressure at the outlet of the evaporator 56.

The external refrigerant circuit 53 is provided with a temperature sensor 57 on the outlet side of the evaporator 56. The temperature sensor 57 detects the temperature of the refrigerant gas in the circuit 53 on the outlet side of the evaporator 56, and sends a predetermined detection signal to the computer C. When the computer C receives a signal from the temperature sensor 57 indicating that the temperature of the circuit 53 is equal to or lower than a predetermined temperature, the computer C then gives an instruction to de-energize the electromagnetic valve 47.

Connected to the computer C are a start switch 58 and a stop switch 59 for the air conditioning system of the vehicle, an accelerator switch 60 for the vehicle and an outside air temperature sensor 61. The computer C enables the de-energizing of the electromagnetic valve 47 in accordance with an ON signal from the start switch 58 and an OFF signal from the accelerator switch 60. The computer C also enables the de-energizing of the electromagnetic valve 47 in accordance with ON signals from the stop switch 59 and the accelerator switch 60. When receiving a signal from the outside air temperature sensor 61 indicating that the temperature of the outside air is equal to or lower than a predetermined temperature, the computer C enables the de-energizing of the electromagnetic valve 47.

The operation of the compressor will now be explained. FIG. 1 illustrates the electromagnetic valve 47 being energized in accordance with an ON signal from the start switch 58. When the electromagnetic valve 47 is energized, the ball valve 43 shown in FIG. 8 closes the valve hole 41a. The high-pressure refrigerant gas in the discharge pressure region $3b_1$ will not therefore be supplied to the crank chamber 2a. The step 34b of the switching piece 34A comes apart from the end face $7a_1$ of the rotary shaft 7, allowing the crank chamber 2a to communicate with the suction chamber 3a via the vent passages 7b, 34e, 34f, 34g and 51. Further, the balls 37 fall into the groove 34c inward from the outer surface of the sleeve 14 as shown in FIG. 8. The sleeve 14 is therefore permitted to slide on the cylinder 12. Under this situation, the pressure in the crank chamber 2a can be controlled by the control valve 25, and the inclined angle of the swash plate 15 can be controllably changed in accordance with the suction pressure that reflects the cooling load.

More specifically, the diaphragm 31 of the control valve 25 is displaced in accordance with a variation in the pressure of the gas introduced through the second port 26b. The diaphragm's displacement is transmitted via the pressing rod 32 to the valve body 29. When the suction pressure is high, i.e., when the cooling load is large, the diaphragm 31 bends to move away from the valve body 29 against the force of the spring 33. This reduces the opening of the valve body 29.

When the pressure inside the crank chamber 2a is higher than the suction pressure then, the refrigerant gas in the crank chamber 2a flows into the suction chamber 3a via the vent passages 7b, 34e, 34f, 34g and 51. If the opening of the valve body 29 becomes small as mentioned above, the pressure in the crank chamber 2a decreases, thus increasing the inclined angle of the swash plate 15.

On the other hand, when the suction pressure is low, i.e., when the cooling load is small, the diaphragm 31 bends toward the valve body 29 by the force of the spring 33, whereby the opening of the valve body 29 increases. As a result, the gas in the discharge chamber 3b is supplied to the crank chamber 2a via the passage 28, and raises the pressure in the crank chamber 2a. This consequently reduces the inclined angle of the swash plate 15. Each piston 20 is actuated in accordance with the inclined angle of the swash plate 15. Refrigerant gas can in this way be supplied to the external refrigerant circuit 53 from the compressor while the displacement amount is controlled.

A description will now be given of the operation for setting the inclined angle of the swash plate 15 to zero. When the electromagnetic valve 47 is de-energized in response to the instruction from the computer C, the movable core 47c comes apart from the fixed core 47b by the force of the spring 48, and abuts on the end wall of the valve housing 47d. As the movable core 47c moves, the ball valve 43, the valve seat 42 and the switching pieces 34B and 34A move together toward the rotary support 18. In the initial stage of the movement of the movable core 47c, the swash plate 15 still remains inclined, so that the balls 37 shown in FIGS. 4 and 9 are in engagement with the inner wall of the sleeve 14. Therefore, the balls 37 are held in the holes 12a without protruding outward from the cylinder 12. This allows the sleeve 14 to slide on the cylinder 12.

With a change in the position of the movable core 47c, the ball valve 43 first moves to the position shown in FIG. 9 from the position shown in FIG. 8. This occurs before the step 34b comes in abutment with the end face $7a_1$ of the rotary shaft 7. The distance over which switching piece 34A moves during this time is shorter than the entire distance L1 over which the movable core 47c moves. Specifically the moving distance is equal to a distance that the side wall $34c_1$ of the groove 34c requires to push the balls 37 against the inner wall of the hole 12a. When the ball valve 43 moves over this particular distance, the ball valve 43 opens the valve hole 41a. Consequently, the high-pressure refrigerant gas in the discharge pressure region $3b_1$ flows into the crank chamber 2a via the pressure passages 41b and 46. When the step 34b abuts on the end face $7a_1$, the vent passage 34e is closed, thus blocking the communication of the crank chamber 2a with the suction chamber 3a via the vent passages 7b, 34e, 34f, 34g and 51.

When the high-pressure refrigerant gas keeps flowing into the crank chamber 2a with the communication between the crank chamber 2a and the suction chamber 3a blocked, the pressure in the crank chamber 2a rapidly rises to the discharge pressure. Then, the inclined angle of the swash plate 15 becomes zero as shown in FIG. 7 and the sleeve 14 moves to the position shown in FIGS. 7 and 10 against the force of the spring 40. Therefore, the compressor's displacement becomes zero, ensuring the same loadless state for the engine as provided in the case where the clutch in the conventional clutch-equipped compressor is deactivated. If the load of the compressor is gone, all the engine power can be directed to driving the vehicle.

Figure 10:
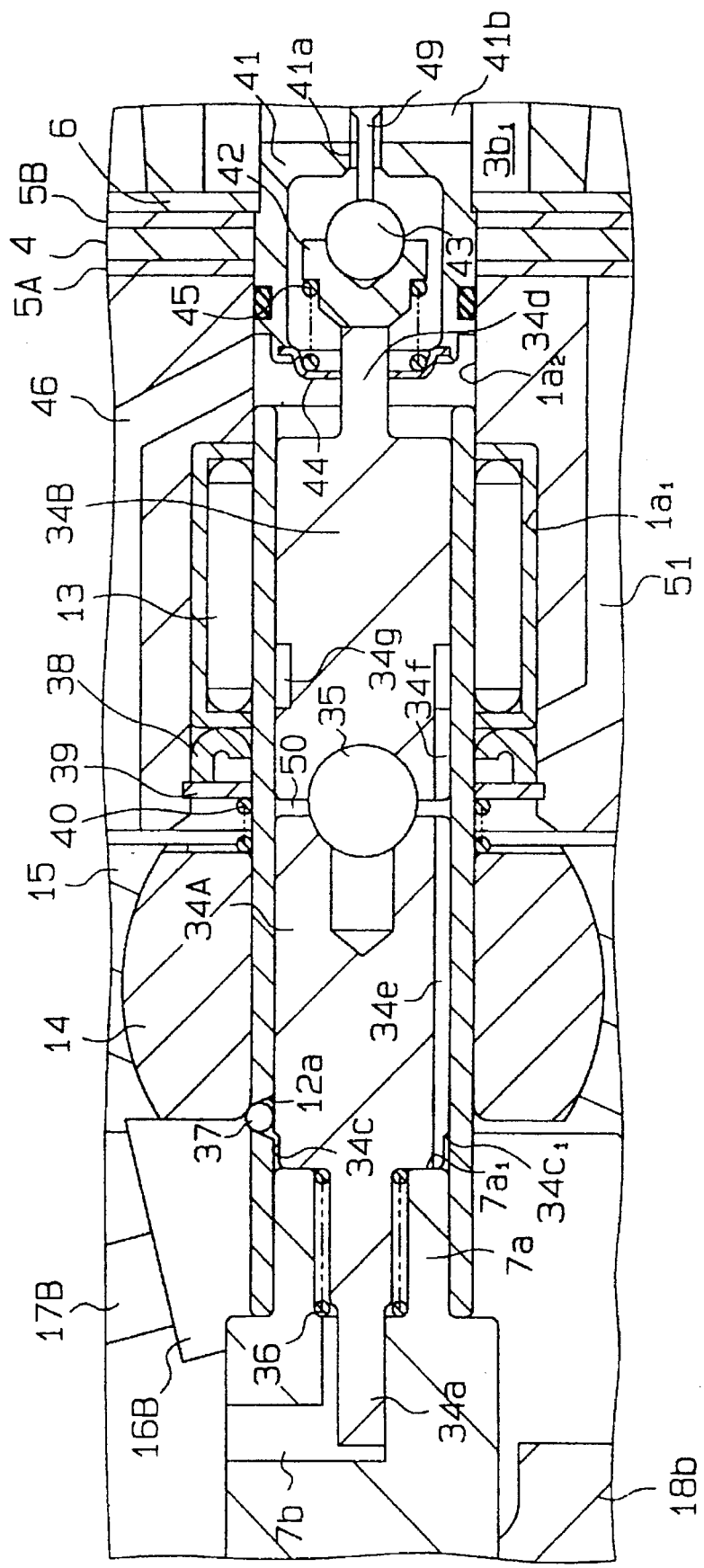
FIG. 10 is an enlarged fragmetary cross-sectional side view showing the ball valve in the FIG. 1 embodiment at the maximum separation from the valve hole.

When the sleeve 14 moves to the position shown in FIG. 10, the balls 37 are separated from the sleeve 14 and can protrude through the holes 12a. As the switching piece 34A is kept urged toward the rotary support 18 by the spring 48 at this time, the balls 37 separate from the groove 34c and reposition themselves on the large-diameter surface of the switching piece 34A, protruding above the outer surface of the cylinder 12 through the holes 12a. Those balls 37 inhibit the movement of the sleeve 14 toward the rotary support 18, keeping the sleeve 14 at the position corresponding to the neutral position of the swash plate 15.

If the inclined angle of the swash plate in the conventional compressor is kept at zero degrees and the displacement amount of zero continues, the pressure in the compressor equalizes. Consequently, the inclined angle of the swash plate 15 cannot be kept at zero degree by the pressure in the crank chamber 2a alone. According to the compressor of this invention, however, the movement of the sleeve 14 toward the rotary support 18 is inhibited by the balls 37, thus preventing the inclined angle of the swash plate 15 from changing unnecessarily.

When the inclined angle of the awash plate 15 changes to zero degrees as described above, the pressure in the crank chamber 2a is held high for a short time. Were such a situation to continue, the sealing of the lip seal 53 would deteriorate allowing the refrigerant gas to leak. According to this embodiment, however, oil is supplied to the lip seal 11 from the oil reservoir 22a via the oil passage 24, and the lubrication of this oil improves the sealing of the lip seal 11, thus preventing the refrigerant gas from leaking from between the lip seal 11 and the rotary shaft 7. The oil supplied to the lip seal 11 is recirculated to the crank chamber 2a.

When the compressor keeps running with the inclined angle of the awash plate 15 maintained at zero degrees, the compressor's displacement amount is zero. Thus, the pressures of the refrigerant gas in the compressor and in the external refrigerant circuit equalizes, so that the swash plate 15 cannot be inclined by reducing the pressure in the crank chamber 2a. In this embodiment, the electromagnetic valve 47 is energized to incline the swash plate 15, as will be described below.

When the start switch 58 is set on, the computer C enables the energizing of the electromagnetic valve 47 based on the detection signal from the temperature sensor 57, the OFF signal from the accelerator switch 60 or the detection signal from the outside air temperature sensor 61. The energizing of the electromagnetic valve 47 causes the movable core 47c to be attracted to the fixed core 47b against the force of the spring 48. Then, the switching pieces 34A and 34B and the ball valve 43 move toward the rear housing 3 by the force of the spring 36, causing the groove 34c to align with the holes 12a. The balls 37 therefore enter the groove 34c and separate from the sleeve 14. As a result, the sleeve 14 moves toward the rotary support 18 by the force of the spring 40, inclining the swash plate 15. Each single-head piston 20 starts reciprocating, thus discharging the refrigerant gas.

According to this embodiment, as described above, the inclined angle of the swash plate 15 is set to zero in accordance with the supply of high-pressure gas into the crank chamber 2a after the de-energizing of the electromagnetic valve 47. The swash plate 15 then returns to the inclined state due to both the interruption in the supply of high-pressure gas to the crank chamber 2a and the force of the spring 40. To keep the sleeve 14 at the position corresponding to the neutral position of the swash plate 15, the balls 37 are manipulated in accordance with the actions of the switching piece 34A caused by the energizing and de-energizing of the electromagnetic valve 47. It is therefore possible to forcibly change the inclined angle of the swash plate 15 to zero, maintain the position of swash plate 15 and also return the swash plate 15 to the inclined state all by the actions of a single electromagnetic valve 47. Accordingly, the compressor can be designed compact and lighter as compared with the conventional clutchless compressor which requires two electromagnetic valves, one for setting the inclined angle of the swash plate to zero and the other for returning the swash plate to the inclined state.

According to this embodiment, with the electromagnetic valve 47 de-energized, the balls 37 are held between the outer surface of the switching piece 3A and the sleeve 14 in order to hinder the movement of the sleeve 14 against the force of the spring 40. Further, the outer surfaces of the balls 37 are pressed against the inner walls of the holes 12a. To effect the smooth release of the balls from this secured state, the members having contacting surfaces should be supplied with adequate lubrication. According to this embodiment, portion 34e of the vent passages 7b, 34e, 34f, 34g and 51 is provided between the switching piece 34A and the cylinder 12 to intersect the groove 34c. This assures that lubricating oil suspended in the refrigerant gas will be supplied to the outer surface of the switching piece 34A and the balls 37. Improved lubrication between the switching piece 34A and the balls 37, in turn assures that the balls 37 can be smoothly released from the switching piece 34A, sleeve 14 and holes 12a.

This embodiment uses a pair of switching pieces 34A and 34B to move the balls 37 in responsive to the movement of the ball valve 43. Both switching pieces 34A and 34B may be formed of a single member. Since the switching pieces are distinctive elements in this embodiment, the rear switching piece 34B does not rotate together with the rotary shaft 7 and the cylinder 12. This prevents the valve seat 42 and the switching piece 34B from wearing portions where they abut.

According to this embodiment, the sensor 52, the temperature sensor 57, the stop switch 59, the accelerator switch 60 and the outside air temperature sensor 61 are used as external signal generators that supply control signals used in controlling the electromagnetic valve 47. Instead of those sensors, a pressure sensor for detecting the pressure of the refrigerant gas or a coolant temperature sensor for sensing the temperature of the coolant of the vehicular engine may be used. If the pressure sensor is used, when the detected pressure deviates from a predetermined range, the inclined angle of the swash plate 15 can be set to zero by de-energizing the electromagnetic valve 47. When the detected pressure falls within the predetermined range, the swash plate 15 can be returned to the inclined state by energizing the electromagnetic valve 47.

The present invention is not limited to the above-described embodiment, but may be embodied me shown in FIGS. 11 and 12 without departing from the scope of the invention. The second embodiment differs from the previous embodiment in that a control valve 63 is provided in the center portion of the rear housing 3.

The internal structure of the control valve 63 will be described with reference to FIG. 12. A coil 65 and a fixed core 66 are retained in a valve housing 64. A guide rod 67 is slidably supported coaxially with the fixed core 66. A movable core 68 is secured on the guide rod 67 so that as the guide rod 67 slides, the movable core 68 moves close to or away from the fixed core 66. The range over which the movable core 68 can move is restricted by the fixed core 66 and a front spring seat 64a of the valve housing 64. A spring seat 67a is formed at the rear end of the guide rod 67, with a spring 69 disposed between the spring seat 67a and the rear end wall 64b of the valve housing 64. The movable core 68 is urged away from the fixed core 66 by the spring 69.

A valve housing 70 is coupled to the valve housing 64, with a ball valve 71 housed in the valve housing 70. The valve housing 70 is provided with a first port 70a, a second port 70b and a control port 70c. The first port 70a communicates with the discharge chamber 3b via a passage 72 for introducing discharged gas. The second port 70b communicates with the suction chamber 3a via a passage 73 for introducing suction gas. The control port 70c communicates with the crank chamber 2a via a passage 74.

The small-diameter end portion 34d of the switching piece 34B abuts on the ball valve 71 through the first port 70a. A return spring 75, disposed between the front end wall of the valve housing 70 and the valve 71, urges the valve 71 to close a valve hole 70d. When the valve hole 70d is closed by the valve 71, the communication between the first port 70a and the control port 70c is blocked.

A diaphragm 76 is provided between the valve housing 64 and the valve housing 70. A pressing rod 77 is slidably accommodated in the valve housing 70 in such a way as to permanently block the second port 70b and the control port 70c. Rear end of the pressing rod 77 is secured to the diaphragm 76. Disposed between the spring seat 64a and the diaphragm 76 is a spring 78 which urges the diaphragm 76 against the pressure of the suction gas. The pressing rod 77 always abuts on the valve 71 by the force of the spring 78.

As shown in FIG. 12, when the movable core 68 contacts the fixed core 66 due to the energization of the coil 65, the valve 71 closes the valve hole 70d and the guide rod 67 separates from the diaphragm 76. When the coil 65 is not energized, the movable core 68 abuts on the spring seat 64a by the force of the spring 69. Under this situation, the guide rod 67 pushes the valve 71 to maximize the opening of the valve 71.

When the pressure of suction gas introduced in the valve housing 70 through the second port 70b changes under the situation shown in FIG. 12, the diaphragm 76 is displaced in accordance with that change. The diaphragm displacement is transmitted via the pressing rod 77 to the valve 71. When the suction pressure is high or the cooling load is large, the diaphragm 76 bends toward the guide rod 67 against the force of the spring 78, reducing the opening of the valve 71. As a result, the amount of the refrigerant gas supplied to the crank chamber 2a from the suction chamber 3a decreases, reducing the pressure inside the crank chamber 2a. This increases the inclined angle of the swash plate. When the suction pressure is low or the cooling load is small, on the other hand, the diaphragm 76 bends toward the valve 71 due to the force of the spring 78, increasing the angle of the valve 71. As a result, the pressure inside the crank chamber 2a rises, reducing the inclined angle of the swash plate.

When the energization of the coil 65 is interrupted, the movable core 68 separates from the fixed core 66 and abuts on the spring seat 64a by the force of the spring 69. This movement of the movable cure 68 maximizes the angle of the valve 71, causing the pressure inside the crank chamber 2a to rapidly rise. Consequently, the inclined angle of the swash plate 15 spontaneously becomes zero. Then, the switching piece 34A moves toward the rotary support 18 in response to the movement of the valve 71, allowing the balls 37 to protrude from the holes 12a. The balls 37 hold the sleeve 14 at the position to maintain the neutral position of the swash plate.

The control valve 63 of this embodiment has the function of the control valve 25 and the function of the electromagnetic valve 47 in the previous embodiment. This further contributes to making the compressor more compact and light.

Instead of the electromagnetic valve 47 in the embodiments of this invention, a hydraulic actuator may be used and the oil supply to the hydraulic actuator may be enabled and blocked by an electromagnetic three way valve or an electromagnetic switch.

Further, the spring 40 used to urge the sleeve 14 may be omitted allowing the structure of the compressor to be modified in such a way that the sleeve 14 receives the centrifugal force in the direction to increase the inclined angle of the swash plate on the sleeve 14 as the swash plate rotates. For instance, the overall center of gravity for the swash plate 15, link pieces 16A and 16B and guide pins 17A and 17B may be set closer to the rotary support 18 and to the support arm 18a than the center of the sleeve 14. This would permit the swash plate 15 to receive the centrifugal force as it rotates.

What is claimed:

1. A compressor having a drive shaft in a crank chamber and a swash plate supported on the drive shaft for integral rotation therewith to drive a piston in a cylinder bore, wherein the piston compresses gas sucked from a suction chamber into the cylinder bore and discharges to a discharge chamber said compressed gas, and whereby the amount of said discharged gas is variable between a minimum value and a maximum value based on variation of the inclined angle of the swash plate between a minimum inclined angle and a maximum inclined angle, said compressor comprising:

mechanical control means for controlling said inclined angle of said swash plate to selectively hold the swash plate at said minimum inclined angle and to release the swash plate for movement;

passage means for leading the gas into the crank chamber from the discharge chamber to alter the inclined angle of the swash plate to said minimum inclined angle so that said mechanical control means can hold the swash plate at the minimum inclined angle;

valve means for selectively opening and closing said passage means to lead the gas into the crank chamber via the passage means when the valve means opens the passage means;

the operation of said mechanical control means being responsive to the operation of said valve means to hold the swash plate at the minimum inclined angle when the valve means opens the passage means, and to release the swash plate when said valve means closes said passage means.

2. A compressor according to claim 1 further comprising:

a cylinder block, said cylinder bore being formed in the cylinder block;

a front housing fixed to the cylinder block, said front housing having said crank chamber; and a rear housing fixed to the cylinder block, said rear housing having said suction chamber and said discharge chamber.

3. A compressor according to claim 2, wherein said passage means includes a region communicating with the discharge chamber and a passage extending within the cylinder block for communicating with the region and the crank chamber.

4. A compressor according to claim 3, wherein said valve means includes:

a valve housing interposed between the region and the passage and having a valve hole communicating with both the region and the passage;

a ball valve for selectively opening and closing the valve hole;

a spring biasing the ball valve to close the valve hole; and drive means for moving the ball valve against biasing force of the spring to open the valve hole.

5. A compressor according to claim 4, wherein said mechanical control means includes:

a cylinder secured to the drive shaft for integral rotation therewith;

a sleeve slidably supported on the cylinder and supporting the swash plate tiltably, said sleeve sliding on the cylinder when the inclined angle of the swash plate is altered;

a switching member slidably accommodated in the cylinder, the switching member sliding in accordance with the opening and closing of the valve hole by the ball valve; and an operation member disposed between the switching member and the cylinder, the operation member being arranged to be retracted in the cylinder in accordance with sliding movement of the switching member to enable the sleeve to slide on the cylinder when the valve hole is closed, and protruding from the cylinder in accordance with the sliding movement of the switching member to regulate the sliding movement of the sleeve on the cylinder, whereby the operation member holds the swash plate at the minimum inclined angle when the valve hole is opened.

6. A compressor according to claim 5, wherein said operation member includes a first ball disposed in a hole formed in the cylinder.

7. A compressor according to claim 6, wherein said switching member has a first switching piece and a second switching piece both disposed coaxially with the drive shaft, a second ball disposed between both the first switching piece and the second switching piece, and a spring for urging the first switching piece and the second switching piece against the second ball;

wherein said first switching piece is connected to the drive shaft for integral rotation therewith and selectively positions the operation member at positions where the operation member retracts in and protrudes from the cylinder; and wherein said second switching piece slides in the cylinder in accordance with the opening and closing of the valve hole, and said sliding movement of the second switching piece is transmitted to the first switching piece via the second ball.

8. A compressor having a drive shaft in a crank chamber and a swash plate supported on the drive shaft for integral rotation therewith to drive a piston in a cylinder bore, wherein the piston compresses gas sucked from a suction chamber into the cylinder bore and discharges to a discharge chamber said compressed gas, and whereby the amount of said discharged gas is variable between a minimum value and a maximum values based on variation of the inclined angle of the swash plate between a minimum value and a maximum value, said compressor comprising:

a cylinder block, said cylinder bore being formed in the cylinder block;

a front housing fixed to the cylinder block, said front housing having said crank chamber;

a rear housing fixed to the cylinder block, said rear housing having said suction chamber and said discharge chamber;

a means defining a discharge pressure region within the rear housing and communicating with the discharge chamber;

a passage extending within the cylinder block for communicating with the discharge pressure region and the crank chamber;

a valve housing interposed between the region and the passage and having a valve hole communicating with both the region and the passage;

a ball valve for selectively opening and closing the valve hole;

a spring biasing the ball valve to close the valve hole;

drive means for moving the ball valve against the biasing force of the spring to open the valve hole;

a cylinder secured to the drive shaft for integral rotation therewith;

a sleeve slidably supported on the cylinder and supporting the swash plate tiltably, said sleeve sliding on the cylinder when the inclined angle of the swash plate is altered;

a switching member slidably accommodated in the cylinder, the switching member sliding in accordance with the opening and closing of the valve hole by the ball valve; and an operation member disposed between the switching member and the cylinder, the operation member being arranged to be retracted in the cylinder in accordance with sliding movement of the switching member to enable the sleeve to slide on the cylinder when the valve hole is closed, and protruding from the cylinder in accordance with the sliding movement of the switching member to regulate the sliding movement of the sleeve on the cylinder, whereby the operation member holds the swash plate at the minimum inclined angle when the valve hole is opened.

9. A compressor according to claim 8, wherein said operation member includes a first ball disposed in a hole formed in the cylinder.

10. A compressor according to claim 9, wherein said switching member has a first switching piece and a second switching piece both disposed coaxially with the drive shaft, a second ball disposed between both the first switching piece and the second switching piece, and a spring for urging the first switching piece and the second switching piece against the second ball;

wherein said first switching piece is connected to the drive shaft for integral rotation therewith and selectively positions the operation member at positions where the operation member retracts in and protrudes from the cylinder; and wherein said second switching piece slides in the cylinder in accordance with the opening and closing operations of the valve hole, and said sliding movement of the second switching piece is transmitted to the first switching piece via the second ball.

11. A compressor communicating with an external refrigerant circuit for supplying refrigerant to the compressor and electrically connected to a controller controlling an operation status of the compressor, said compressor having a drive shaft in a crank chamber and a swash plate supported on the drive shaft for integral rotation therewith to drive a piston in a cylinder bore, wherein the piston compresses gas sucked from a suction chamber into the cylinder bore and discharges said compressed gas to a discharge chamber, and whereby the amount of said discharged gas is variable between a minimum value and a maximum value based on variation of the inclined angle of the swash plate between a minimum inclined angle and a maximum inclined angle, said compressor comprising:

mechanical control means controlling said inclined angle of said swash plate to selectively hold the swash plate at said minimum inclined angle and to release the swash plate for movement;

passage means for leading the gas into the crank chamber from the discharge chamber to alter the inclined angle of the swash plate to said minimum inclined angle so that the mechanical control means can hold the swash plate at the minimum inclined angle;

valve means for selectively opening and closing said passage means to lead the gas into the crank chamber via the passage means when the valve means opens the passage means;

the operation of said mechanical control means being responsive to the operation of said valve means to hold the swash plate at the minimum inclined angle when the valve means opens the passage means, and to release the swash plate to allow the movement of said swash plate when said valve means closes said passage means.

12. A compressor according to claim 11, wherein said valve means includes:

a valve housing interposed between the discharge chamber and the passage and having a valve hole communicating with both the discharge chamber and the passage;

a ball valve for selectively opening and closing the valve hole;

a spring biasing the ball valve to close the valve hole; and drive means for moving the ball valve against the biasing force of the spring to open the valve hole.

13. A compressor according to claim 12, wherein said drive means includes an electromagnetic valve disposed adjacent to the valve housing and closing the valve hole with the ball valve according to the urging force of the spring when the electromagnetic valve is not activated, and driving the ball valve against the urging force of the spring to open the valve hole when the electromagnetic valve is activated in response to an electric signal provided from the controller.

14. A compressor according to claim 13, wherein said electromagnetic valve includes:

a coil;

a fixed core energized by means of electric current flowing into the coil; and a movable core disposed between the fixed core and the ball valve for moving the ball valve toward the valve hole according to the urging force of the spring when being attracted by the energized fixed core.

15. A compressor according to claim 13 further comprising:

a detector for detecting the rotation of the rotary shaft; and a signal generator for generating a control signal to control the electromagnetic valve when the signal generator receives a signal from the detector.

16. A compressor according to claim 13, wherein said external refrigerant circuit supplies the gas discharged from the discharge chamber to the suction chamber after condensing, expanding and evaporating the gas;

a sensor for detecting temperature of the gas evaporated in the external refrigerant circuit; and said signal generator generating the control signal when receiving a signal from the sensor.

\* \* \* \* \*

UNITED STATES PATENT AND TRADEMARK OFFICE
CERTIFICATE OF CORRECTION

PATENT NO. : 5,624,240
DATED : April 29, 1997
INVENTOR(S) : Kawaguchi et al

It is certified that error appears in the above-indentified patent and that said Letters Patent is hereby corrected as shown below:

In the Abstract, line 7, after "between" delete "a";
line 9, after "between" delete "a".

Column 1, line 62, after "opens" delete second occurrence "the", insert --gas--.

Column 2, line 5, "mount" should read --amount--;
line 9, after "change" insert comma --,--; after "making" delete comma ","; line 29, after "and" insert --discharges--.

Column 3, line 1, "fragmetary" should read --fragmentary--; after "fragmentary" insert --cross-sectional--; line 2, before "FIG. 1" insert --the--; after "FIG. 1" delete "the"; before "closed" insert --embodiment in--;
line 3, "fragmetary" should read --fragmentary--;
line 6, "fragmetary" should read --fragmentary--;
line 13" after "enlarged" insert --fragmentary--;
line 26, after "plate" insert --6.--.

UNITED STATES PATENT AND TRADEMARK OFFICE
CERTIFICATE OF CORRECTION

PATENT NO. : 5,624,240
DATED : April 29, 1997
INVENTOR(S) : Kawaguchi et al

It is certified that error appears in the above-indentified patent and that said Letters Patent is hereby corrected as shown below:

Column 4, line 16, "backyard" should read --backward--.

Column 5, line 50, after "member" change semi-colon ";" to comma --,--.

Column 6, line 19, "passage" should --passages--.

Column 9, line 19, "awash" should read --swash--;
line 32, "awash" should read --swash--

Column 10, line 12, "3A" should read --34A--;
line 52, "me" should read --as--.

Column 11, line 57, "cure" should read --core--.

Column 13, line 4, before "biasing" insert --the--.
line 57, "values" should read --value--.

Signed and Sealed this

Third Day of February, 1998

BRUCE LEHMAN

Attest:

Attesting Officer

Commissioner of Patents and Trademarks